United States Patent [19]

Yoneyama et al.

[11] Patent Number: 4,542,418

[45] Date of Patent: Sep. 17, 1985

[54] METHOD AND APPARATUS FOR REPRODUCING AN INFORMATION SIGNAL COMPRISED OF A VIDEO SIGNAL AND AUDIO SIGNAL

[75] Inventors: Shigeyuki Yoneyama, Tokyo; Kenji Nakano, Ebina; Hisayoshi Moriwaki, Isehara; Takao Takahashi, Sagamihara, all of Japan

[73] Assignee: Sony Corporation, Tokyo, Japan

[21] Appl. No.: 459,933

[22] Filed: Jan. 21, 1983

[30] Foreign Application Priority Data

Jan. 22, 1982 [JP] Japan .................................. 57-9414

[51] Int. Cl.[4] .............................................. H04N 5/91
[52] U.S. Cl. ..................................... 360/19.1; 360/32; 360/64; 358/343
[58] Field of Search ................... 360/19.1, 32, 61, 64, 360/8; 358/343

[56] References Cited

U.S. PATENT DOCUMENTS

| Re. 27,734 | 8/1973 | Warren | 360/19.1 |
|---|---|---|---|
| 3,935,591 | 1/1976 | Hopkins | 360/19.1 |
| 4,303,950 | 12/1981 | Taniguchi | 360/8 |
| 4,390,906 | 6/1983 | Turumoto | 360/33.1 |

FOREIGN PATENT DOCUMENTS

| 3034716 | 4/1981 | Fed. Rep. of Germany | 360/19.1 |
|---|---|---|---|
| 3217031 | 11/1982 | Fed. Rep. of Germany | 360/32 |
| 3216849 | 12/1982 | Fed. Rep. of Germany | 360/32 |
| 56-74803 | 6/1981 | Japan | 360/19.1 |
| 2059135 | 4/1981 | United Kingdom | 360/19.1 |
| 2097968 | 11/1982 | United Kingdom | 360/19.1 |
| 2102183 | 1/1983 | United Kingdom | 360/32 |

Primary Examiner—Alan Faber
Attorney, Agent, or Firm—Lewis H. Eslinger; Alvin Sinderbrand

[57] ABSTRACT

A reproducing section of a helical scan VTR for reproducing a color television signal recorded in a plurality of successive parallel tracks on a magnetic tape and comprised of a video signal and at least one of a frequency-modulated audio signal and the combination of a PCM audio signal and run-in signal, with the video signal and frequency-modulated audio signal being recorded only in a main section of each track and the PCM audio signal being recorded only in an overscan section of each track, the VTR including a pair of magnetic heads which scan the tracks to reproduce the information signal recorded therein; a pair of switch circuits connected to the heads and which separate the information signal reproduced during scanning of the main section of each track and a signal reproduced during scanning of the overscan section of each track; a detector which detects the presence or absence of a run-in signal from the separated signal reproduced during scanning of the overscan section of each track and produces a detection signal in response thereto; an output; and a switch for switching an analog audio signal reproduced from the PCM audio signal to the output in response to the detection signal when a run-in signal is detected and an analog audio signal reproduced from the frequency-modulated audio signal to the output in response to the detection signal when no run-in signal is detected.

15 Claims, 16 Drawing Figures

METHOD AND APPARATUS FOR REPRODUCING AN INFORMATION SIGNAL COMPRISED OF A VIDEO SIGNAL AND AUDIO SIGNAL

BACKGROUND OF THE INVENTION

This invention relates generally to a method and apparatus for reproducing an information signal and, more particularly, is directed to a method and apparatus for reproducing a color television signal comprised of a video signal and at least one of a frequency-modulated audio signal and a PCM audio signal recorded on a magnetic tape with at least one rotary magnetic head.

Information signal recording and reproducing apparatus for recording and reproducing a video signal on a magnetic tape by means of a rotary magnetic head assembly are well known in the art. For example, in a helical scan video tape recorder (VTR), at least one rotary magnetic head is rotated at a predetermined angle with respect to the longitudinal or tape running direction of the magnetic tape as the latter is advanced so as to form successive video tracks extending obliquely on the magnetic tape. With the helical scan video tape recorder, it is possible to achieve high density recording of the video signal by advancing the magnetic tape at a slow running speed and, at the same time, providing a high relative speed between the magnetic head assembly and magnetic tape. However, with known helical scan video tape recorders in which an audio signal is recorded and reproduced on an audio track extending in the longitudinal or tape running direction of the magnetic tape by a stationary magnetic head, there results a deterioration of the signal-to-noise (S/N) ratio and an increase in the wow and flutter when the speed of advancement of the magnetic tape is reduced. This, of course, results in a deterioration in the quality of the reproduced audio signal, causing the audio signal to have unsatisfactory quality when reproduced.

In order to overcome the aforementioned problem in the recording and reproducing of an audio signal by a stationary magnetic head, it has been proposed to effect the recording and reproducing of the audio signal by means of a rotary magnetic head. It has been proposed to use one inexpensive arrangement (hereinafter referred to as a Type I arrangement) to frequency modulate the audio signal and then frequency-superimpose the frequency-modulated audio signal onto the frequency-modulated video signal. The combined signal is then recorded in successive parallel tracks on the magnetic tape by the rotary magnetic head assembly. It has also been proposed to use a more expensive arrangement (hereinafter referred to as a Type II arrangement) whereby, in addition, or as an alternative, to recording the audio signal as a frequency-modulated audio signal, the audio signal is digitized as a PCM audio signal and then recorded in an overscan section of each track which is provided, for example, by increasing the tape winding angle about the guide drum assembly of the helical scan video tape recorder. In this manner, each record track obliquely formed on the magnetic tape by the rotary magnetic head assembly includes a video track section and an audio track section, the latter of which corresponds to the aforementioned overscan section. The audio signal that is recorded in the audio track section of each track is recorded as high density data obtained by processing the signal with a time axis or base compression and a complementary time axis or base expansion.

It is to be appreciated that, during reproduction, because of a better frequency characteristic, signal-to-noise (S/N) ratio, and the like, the analog audio signal reproduced from a PCM audio signal is of a higher quality than the analog audio signal reproduced from a frequency-modulated audio signal. In this manner, less expensive Type I helical scan VTRs reproduce only the frequency-modulated audio signal mixed with the video signal, while more expensive Type II VTRs reproduce only the higher quality PCM audio signal with the video signal. It is to be appreciated, however, that in the case of a recording in which only the frequency-modulated audio signal is superimposed on the video signal, only Type I VTRs can be used to reproduce the audio signal. If such a recording is reproduced by a Type II VTR, since no PCM audio signal is present, no sound will be reproduced. The converse may not be true since Type II VTRs may record both a frequency-modulated audio signal superimposed on the video signal and a PCM audio signal in an overscan section of each track, so that a Type I VTR would reproduce the frequency-modulated audio signal recorded by a Type II VTR. However, as previously stated, the PCM audio signal is of much higher quality than the frequency-modulated audio signal. Thus, if a Type II VTR only records the PCM audio signal and does not also record the frequency-modulated audio signal, the audio signal reproduced by a Type II VTR will likewise not be reproduced by a Type I VTR.

OBJECTS AND SUMMARY OF THE INVENTION

Accordingly, it is an object of this invention to provide a method and apparatus for reproducing an information signal that avoids the above-described difficulties encountered with the prior art.

More particularly, it is an object of this invention to provide a method and apparatus for reproducing an information signal comprised of a video signal and an audio signal, regardless of the manner in which the audio signal is recorded.

It is another object of this invention to provide a method and apparatus for reproducing an information signal comprised of a video signal and an audio signal, regardless of whether the audio signal is recorded as a frequency-modulated audio signal or a PCM audio signal.

In accordance with an aspect of this invention, apparatus for reproducing an information signal recorded in a plurality of successive parallel tracks on a record medium and comprised of a video signal and at least one of a frequency-modulated audio signal and a digitized audio signal, with the video signal and frequency-modulated audio signal being recorded only in a main section of each track and the digitized audio signal being recorded only in an overscan section of each track, includes transducer means for scanning the tracks to reproduce the information signal recorded in the plurality of successive parallel tracks; separation means for separating the information signal reproduced during scanning of the main section of each track by the transducer means and a signal reproduced during scanning of the overscan section of each track by the transducer means; detecting means for detecting whether the separated signal reproduced during scanning of the overscan section of each track includes a digitized audio signal and producing a detection signal in response thereto; output means; and switch means for switching an audio signal corresponding to one of the digitized audio signal and frequency-modulated audio signal to the output means in response to the detection signal.

In accordance with another aspect of this invention, a method of reproducing an information signal recorded in a plurality of successive parallel tracks on a record medium and comprised of a video signal and at least one of a frequency-modulated audio signal and a digitized audio signal, with the video signal and frequency-modulated audio signal being recorded only in a main section of each track and the digitized audio signal being recorded only in an overscan section of each track, includes the steps of scanning the tracks to reproduce the information signal recorded in the plurality of successive parallel tracks; separating the information signal reproduced during scanning of the main section of each track and a signal reproduced during scanning of the overscan section of each track; detecting whether the separated signal reproduced during scanning of the overscan section of each track includes a digitized audio signal; producing a detection signal in response to the step of detecting; and switching an audio signal corresponding to one of the digitized audio signal and the frequency-modulated audio signal to output means in response to the detection signal.

The above, and other, objects, features and advantages of the present invention will become readily apparent from the following detailed description thereof which is to be read in connection with the accompanying drawings.

DETAILED DESCRIPTION OF A PREFERRED EMBODIMENT

Figure 1:
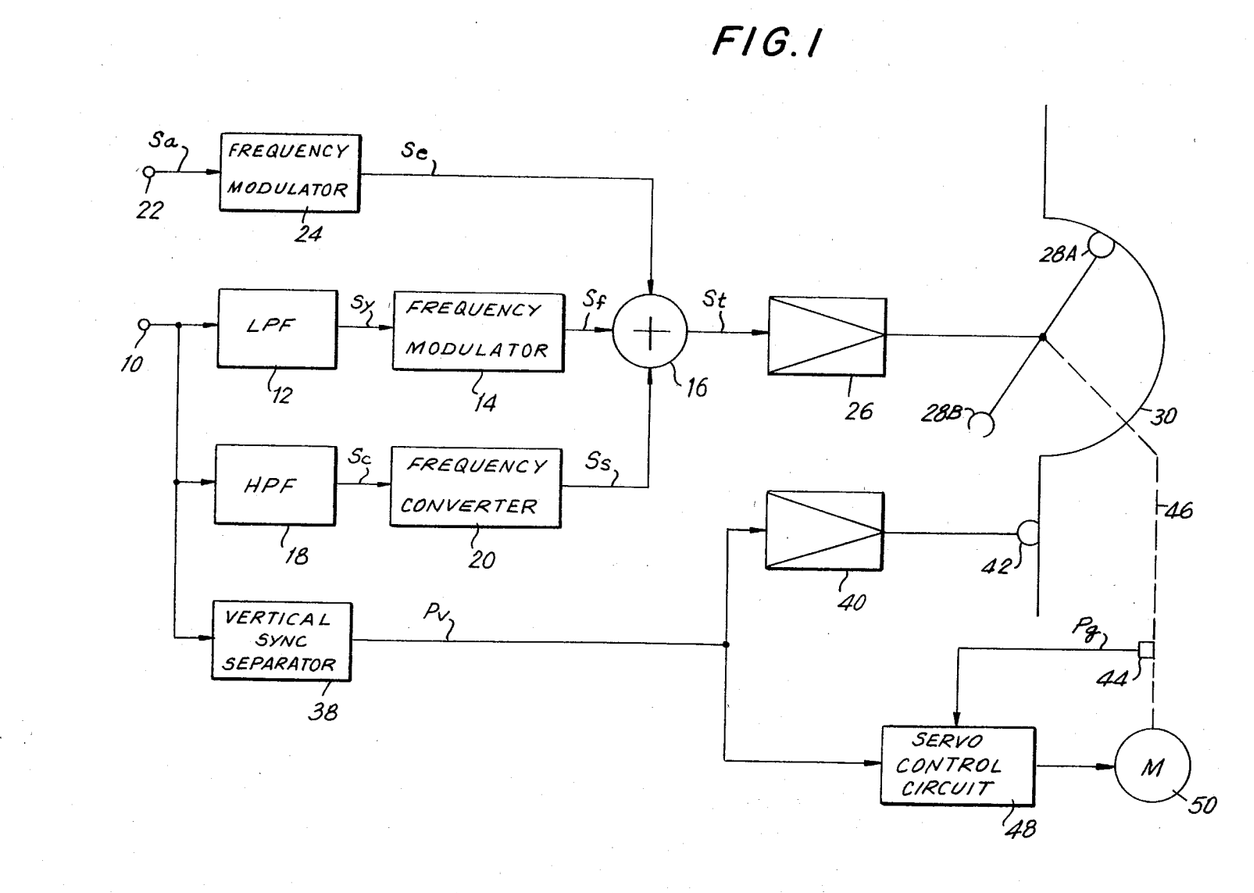
FIG. 1 is a block diagram of the recording section of a proposed Type I helical scan video tape recorder.
Figure 3A:
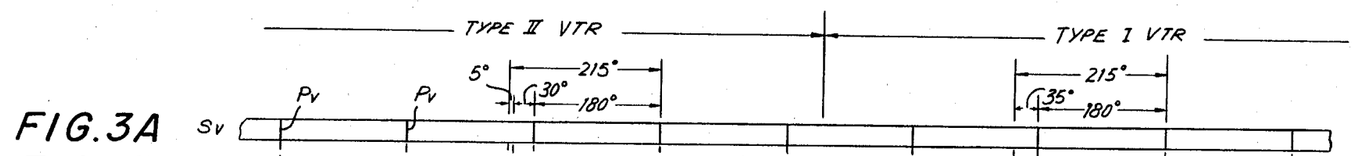
FIGS. 3A–3H are timing charts illustrating the relationship for recording the video and audio signals with the Type I and Type II VTRs of FIGS. 1 and 2, respectively, and for reproducing the video and audio signals with the VTR according to the present invention shown in FIG. 7.

Referring to the drawings in detail, and initially to FIG. 1 thereof, a recording section of a proposed Type I helical scan video tape recorder (VTR) includes a low pass filter (LPF) 12 supplied with a color video signal from an input terminal 10. The luminance component $S_y$, shown in FIG. 3A, is separated from the input color video signal by LPF 12 and supplied to a frequency-modulation circuit 14 which, in turn, frequency modulates the luminance component $S_y$ to produce a frequency-modulated luminance signal $S_f$ and supplies the frequency-modulated luminance signal $S_f$ to one input of an adder 16. The color video signal from input terminal 10 is also supplied to a high pass filter (HPF) 18 which separates the chrominance component $S_c$ therefrom. The chrominance component $S_c$ is then frequency converted to a lower frequency band by a frequency converter 20 which supplies a frequency-converted chrominance signal $S_s$ to another input of adder 16.

Figure 3B:
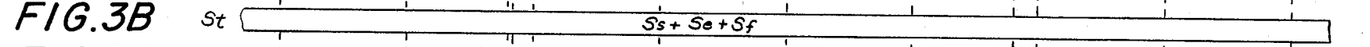
Figure 4A:
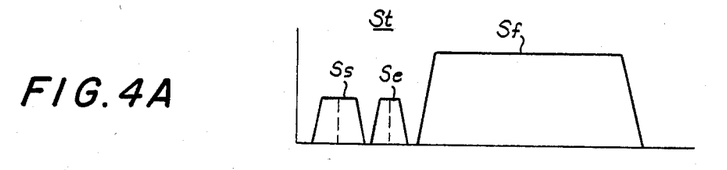
FIG. 4A is a frequency diagram illustrating the frequency spectrum of a frequency-modulated audio signal and corresponding video signal.

In addition, an analog audio signal $S_a$ is supplied to an audio circuit of the recording section and, in particular, is supplied to a frequency-modulation circuit 24 from an input terminal 22. Frequency-modulation circuit 24, in turn, supplies a frequency-modulated audio signal $S_e$ to another input of adder 16, the latter adder 16 functioning to combine the frequency-modulated audio signal $S_e$, the frequency-modulated luminance signal $S_f$ and the frequency-converted chrominance signal $S_s$ to produce a combined television signal $S_t$, as shown in FIG. 3B. It is to be appreciated that signals $S_e$, $S_f$ and $S_s$ occupy distinct frequency bands and therefore do not interfere with one another, as shown in FIG. 4A. Combined television signal $S_t$ is then supplied through a recording amplifier 26 to rotary magnetic heads 28A and 28B to be recorded in successive parallel tracks on a magnetic tape 30 in the form shown in FIG. 6A.

Figure 5:
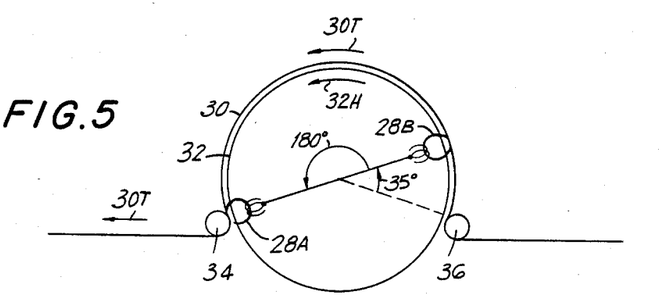
FIG. 5 is a schematic plan view of a rotary magnetic head assembly for a helical scan video tape recorder that can be used with the present invention.

As shown in FIG. 5, rotary magnetic heads 28A and 28B are arranged to subtend an angle of 180°, that is, the two rotary magnetic heads 28A and 28B are arranged in diametrically opposing relation to each other. The rotary magnetic head assembly includes a rotary guide drum 32 which is rotated, along with heads 28A and 28B secured thereto, in the direction of arrow 32H, and magnetic tape 30 is helically wound about the outer periphery of rotary guide drum 32 so as to subtend an angle of approximately 215°. Magnetic tape 30 is advanced at a constant speed in the direction of arrow 30T by a tape drive system (not shown) comprised of a capstan and pinch roller and is guided about guide drum 32 by guide rollers or pins 34 and 36. During the recording operation, rotary magnetic heads 28A and 28B alternately trace tracks $T_A$ and $T_B$, as shown, for example, in FIG. 6A. In this manner, each record track $T_A$ is used for recording video and audio signals in odd field intervals, while the remaining alternate record tracks $T_B$ are used for recording video and audio signals in even field intervals.

It is to be appreciated that, since the angle between rotary magnetic heads 28A and 28B is less than the angle subtended by the tape wound about the outer periphery of rotary guide drum 32, rotary magnetic heads 28A and 28B are simultaneously in contact with magnetic tape 30 during an overscan or overlap period. In particular, and referring to FIGS. 5 and 6A, with the recording section of FIG. 1, during the first 35° rotation of rotary magnetic heads 28A and 28B, no signals are recorded on record tracks $T_A$ and $T_B$, respectively. During the next 180° rotation of the heads, the mixed or superimposed audio and video signals, that is, combined television signal $S_t$ is recorded in a main section of each of parallel tracks $T_A$ and $T_B$, with each track containing information corresponding to one field interval of the video signal.

Figure 6A:
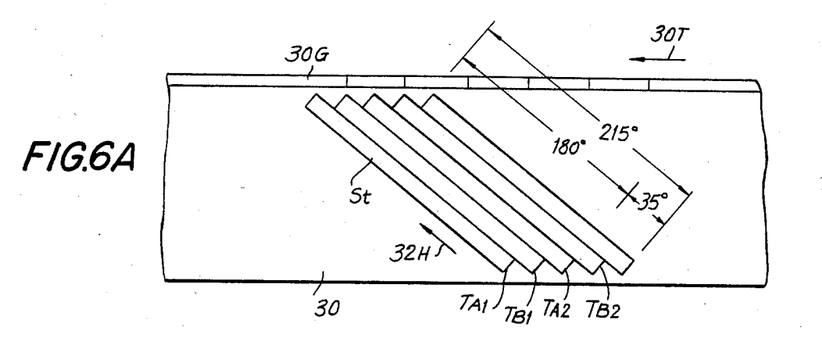
FIG. 6A is a schematic plan view of a section of magnetic tape showing the arrangement in which the video and audio signals are recorded with the Type I VTR of FIG. 1.

In addition, a servo control track 30G provided at the upper edge of magnetic tape 30 has recorded therein a control pulse signal for every two record tracks $T_A$ and $T_B$, that is, corresponding to each frame interval of the video signal. More particularly, the color video signal from input terminal 10 is supplied to a vertical synchronizing signal separating circuit 38 which separates the vertical synchronizing signal $P_v$ therefrom. The latter vertical synchronizing signal $P_v$ is supplied to a recording amplifier 40 which, in turn, supplies the aforementioned control pulse signal, which is in synchronism with the vertical synchronizing signal $P_v$, to a magnetic head 42 positioned at the upper edge of magnetic tape 30 for recording the control pulse signal in servo control track 30G. In order to control the rotary speed and phase of the rotary magnetic heads, a pulse generator 44 associated with a rotary shaft 46 about which rotary magnetic heads 28A and 28B are rotated, produces a pulse $P_g$ for each revolution of rotary magnetic heads 28A and 28B. In response to pulses $P_g$ and vertical synchronizing signal $P_v$ supplied thereto, a servo control circuit 48 supplies an output signal to a motor 50 which controls the rotary speed and phase of magnetic heads 28A and 28B such that rotation of magnetic heads 28A and 28B occurs in synchronism with vertical synchronizing signal $P_v$ and such that there is a rotational delay of 35° from the beginning of each track before each head 28A and 28B begins recording combined television signal $S_t$ in the respective record track, as shown in FIGS. 5 and 6A. In other words, as shown in FIG. 6A, each track $T_A$ and $T_B$ corresponds to a rotation of 215° for each respective head 28A and 28B. During the first 35° rotation for each track, no signal is supplied to the respective head, and accordingly, no signal is recorded in the respective track. During the following 80° rotation, combined television signal $S_t$ is supplied through recording amplifier 26 to the respective head 28A or 28B. It is to be appreciated that, in such case, appropriate switching circuitry, although not shown, may be provided for preventing any signal from being recorded during the first 35° rotation for each record track. Alternatively, it is to be appreciated that, during the first 35° rotation of, for example, magnetic head 28B with respect to track $T_{B1}$, magnetic head 28A is also in contact with magnetic tape 30 during the last 35° rotation for the previous adjacent track $T_{A1}$. In such case, the combined television signal $S_t$ supplied to magnetic head 28A during the last 35° rotation thereof may also be supplied to magnetic head 28B, to be recorded in track $T_{B1}$, during the first 35° rotation thereof. In such case, during reproduction, appropriate switching circuitry, for example, as will be described in greater detail hereinafter with respect to FIG. 7 of this application, can be provided for reproducing the combined television signal $S_t$ only during the last 180° rotation for each record track $T_A$ and $T_B$.

Figure 2:
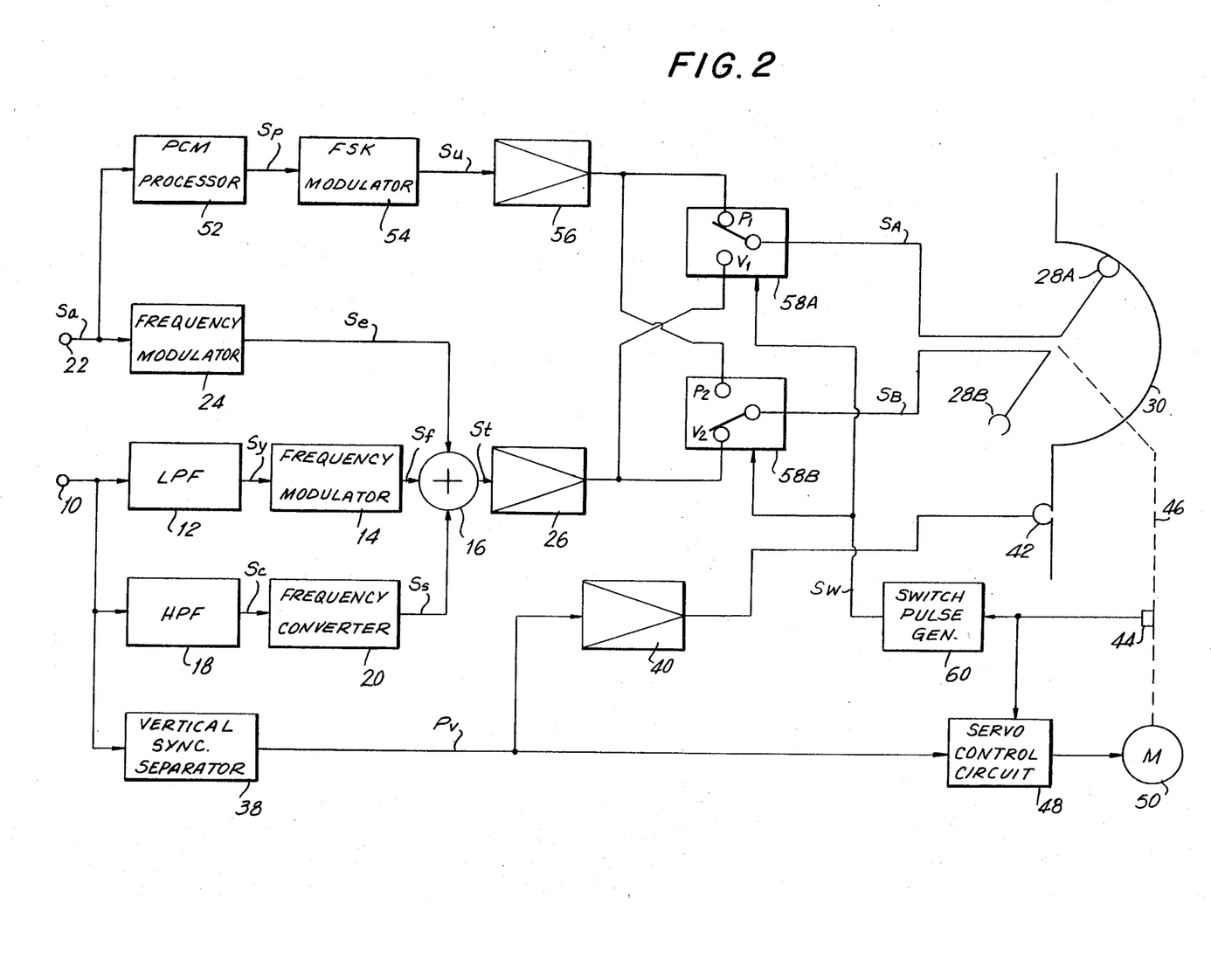
FIG. 2 is a block diagram of the recording section of a proposed Type II helical scan video tape recorder.

Referring now to FIG. 2, the recording section of a proposed Type II helical scan VTR will now be described, in which elements corresponding to those previously described in regard to the Type I VTR of FIG. 1 are identified by the same reference numerals and a detailed description thereof will be omitted herein for the sake of brevity. More particularly, during the last 180° rotation of each of magnetic heads 28A and 28B, the combined television signal $S_t$ comprised of the frequency-modulated luminance signal $S_f$, the frequency-converted chrominance signal $S_s$ and the frequency-modulated audio signal $S_e$, is recorded in the main section of each track, as previously described. In addition, the Type II VTR of FIG. 2 is designed to also record a pulse code modulated (PCM) audio signal in an audio track section or overscan section of each track during the first 35° rotation of magnetic heads 28A and 28B with respect to each record track. More particularly, audio signal $S_a$ from input terminal 22 is also supplied to a PCM processing circuit 52 which includes an analog-to-digital (A/D) converting circuit which converts the analog audio signal $S_a$ to a digital signal, a PCM encoding circuit which encodes the digital signal and adds error correcting codes thereto to produce an encoded PCM audio signal and a compression circuit which compresses the encoded PCM audio signal to produce a compressed PCM audio signal $S_p$ at the output of PCM processing circuit 52. The latter output signal from PCM processing circuit 52 may then be supplied to a frequency shift key (FSK) modulation circuit 54 which frequency modulates the PCM audio signal $S_p$ from PCM processing circuit 52. FSK modulation circuit 54 may include first and second oscillators which generate oscillation signals having frequencies $f_1$ and $f_2$, respectively, and a switching circuit coupled to PCM processing circuit 52 for selecting the oscillation signal generated by the one of the oscillators in response to the PCM audio signal $S_p$ supplied thereto. For example, the switching circuit may be responsive to each logic level "0" portion of the PCM audio signal to select the first oscillation signal having a frequency $f_1$, and responsive to each logic level "1" portion of the PCM audio signal to select the oscillation signal having a frequency $f_2$. As a result, FSK modulation circuit 54 may be thought of as modulating logic level "0" portions of the PCM audio signal $S_p$ with the oscillation signal having a frequency $f_1$ and modulating logic level "1" portions of the PCM audio signal $S_p$ with the oscillation signal having a frequency $f_2$. It is to be appreciated, however, that FSK modulation circuit 54 is optional.

Figure 3C:
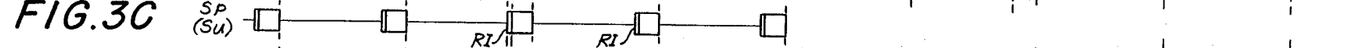
Figure 3E:
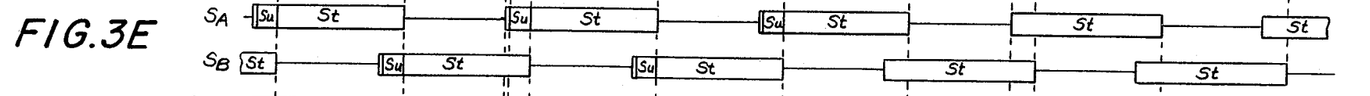
Figure 4B:
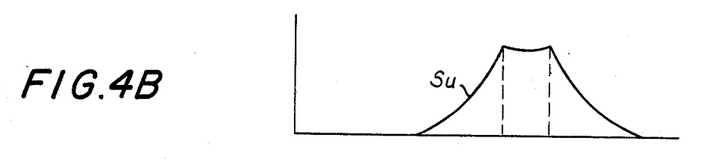
FIG. 4B is a frequency diagram illustrating the frequency spectrum of a PCM audio signal.
Figure 6B:
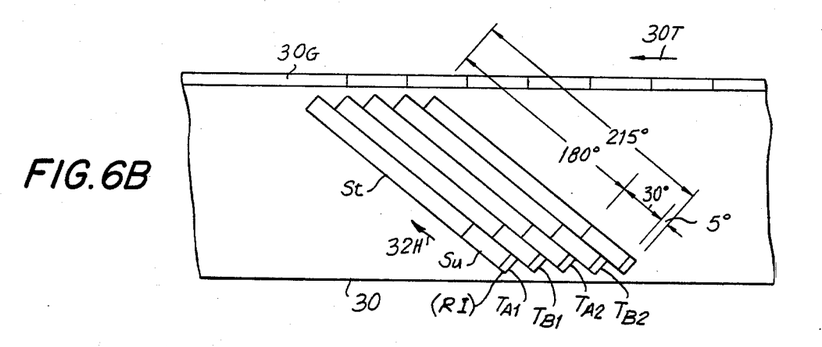
FIG. 6B is a schematic plan view of a section of magnetic tape showing the arrangement in which the video and audio signals are recorded with the Type II VTR of FIG. 2.

The output PCM audio signal $S_u$ from FSK modulation circuit 54, shown in FIG. 3C and the frequency spectrum of which is shown in FIG. 4B, is supplied through a recording amplifier 56 to input contacts $P_1$ and $P_2$ of change-over switch circuits 58A and 58B, respectively, while the combined television signal $S_t$ is supplied through recording amplifier 26 to input contacts $V_1$ and $V_2$ of switch circuits 58A and 58B, respectively. Each of switch circuits 58A and 58B includes a movable arm which switches either PCM audio signal $S_u$ from recording amplifier 56 or the combined television signal $S_t$ from recording amplifier 26 to rotary magnetic heads 28A and 28B, in accordance with the timing chart shown in FIG. 3E. In this manner, the combined television signal $S_t$, which contains the video signal and the frequency-modulated audio signal, is recorded in the trailing main section of each record track $T_A$ and $T_B$ corresponding to the last 180° rotation of the magnetic heads with respect the record tracks, while the PCM audio signal $S_u$ is recorded in the overscan section of each track at the leading edge thereof corresponding to the last 30° rotation of the aforementioned first 35° rotation of the magnetic heads with respect to the record tracks, as shown in FIG. 6B. In other words, during the first 5° rotation of each head with respect to a track, no signal is recorded, and the PCM audio signal $S_u$ is then recorded during the next 30° rotation of the respective head.

Figure 3D:
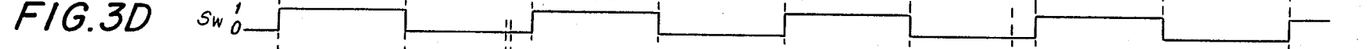

More particularly, each change-over switch circuit 58A and 58B is responsive to a switch control signal $S_w$, shown in FIG. 3D, supplied thereto from a switch pulse generating circuit 60, to couple its input contact P or its input contact V to the respective magnetic head 28A or 28B. For example, when switch control signal $S_w$ is at a high or logic "1" level, the movable arms of switch circuits 58A and 58B are controlled to connect contacts $V_1$ and $P_2$, respectively, to the outputs thereof. More particularly, at such time, combined television signal $S_t$ from recording amplifier 26 is supplied to magnetic head 28A to be recorded in the main section of a record track $T_A$ during the last 180° rotation of magnetic head 28A with respect to that track, and PCM audio signal $S_u$ is supplied by recording amplifier 56 to magnetic head 28B to be recorded in the overscan section at the leading portion of the next adjacent track $T_B$, as shown in FIG. 6E. When switch control signal $S_w$ is at a low or logic "0" level, the reverse condition occurs, namely, PCM audio signal $S_u$ is supplied through switch circuit 58A to magnetic head 28A, while combined television signal $S_t$ is supplied through switch circuit 58B to magnetic head 28B following the PCM audio signal $S_u$ that had been recorded during the previous field interval in the same track, as shown in FIG. 6E. As shown in FIG. 2, switch pulse generating circuit 60 is connected to the output of pulse generator 44 and produces switch control signal $S_w$ in response to pulses $P_g$.

However, a problem results if a Type II VTR attempts to reproduce the signal recorded by a Type I VTR. In such case, only a frequency-modulated audio signal $S_e$ is recorded in each track. Since a Type II VTR is designed to reproduce only a PCM audio signal $S_u$ recorded in the overscan section of each track, no audio signal is reproduced by the Type II VTR. It is to be appreciated that a reproducing section of a Type I VTR which is complementary to the recording section of FIG. 1 would reproduce an audio signal recorded by the Type II VTR of FIG. 2. However, if the Type II VTR of FIG. 2 were modified so that the frequency-modulated audio signal $S_e$ was not produced and was not added to the video signal in adder 16, the reproducing section of a Type I VTR which is complementary to the recording section of FIG. 1 would not reproduce any audio signal either. Accordingly, the present invention is designed to detect whether a PCM audio signal is recorded in the overscan section of the record tracks for determining whether to reproduce a frequency-modulated audio signal $S_e$ or a PCM audio signal $S_u$ during reproduction.

It is to be appreciated that, with the Type II VTR of FIG. 2, it has been indicated that the PCM audio signal $S_u$ is recorded in an overscan section corresponding to a 30° rotation of each head. With the present invention, during the first 5° rotation of each head with respect to a track, a run-in signal RI, which is predetermined and which indicates that a PCM audio signal $S_u$ is recorded during the next 30° rotation of the respective magnetic head, is recorded in each track, as shown in FIG. 6B. Run-in signal RI may be generated by PCM processing circuit 52 and added to each compressed PCM signal to be recorded.

Figure 3F:
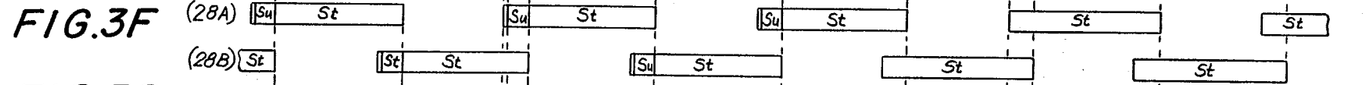
Figure 3G:
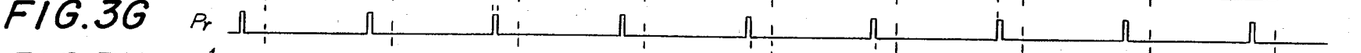
Figure 7:
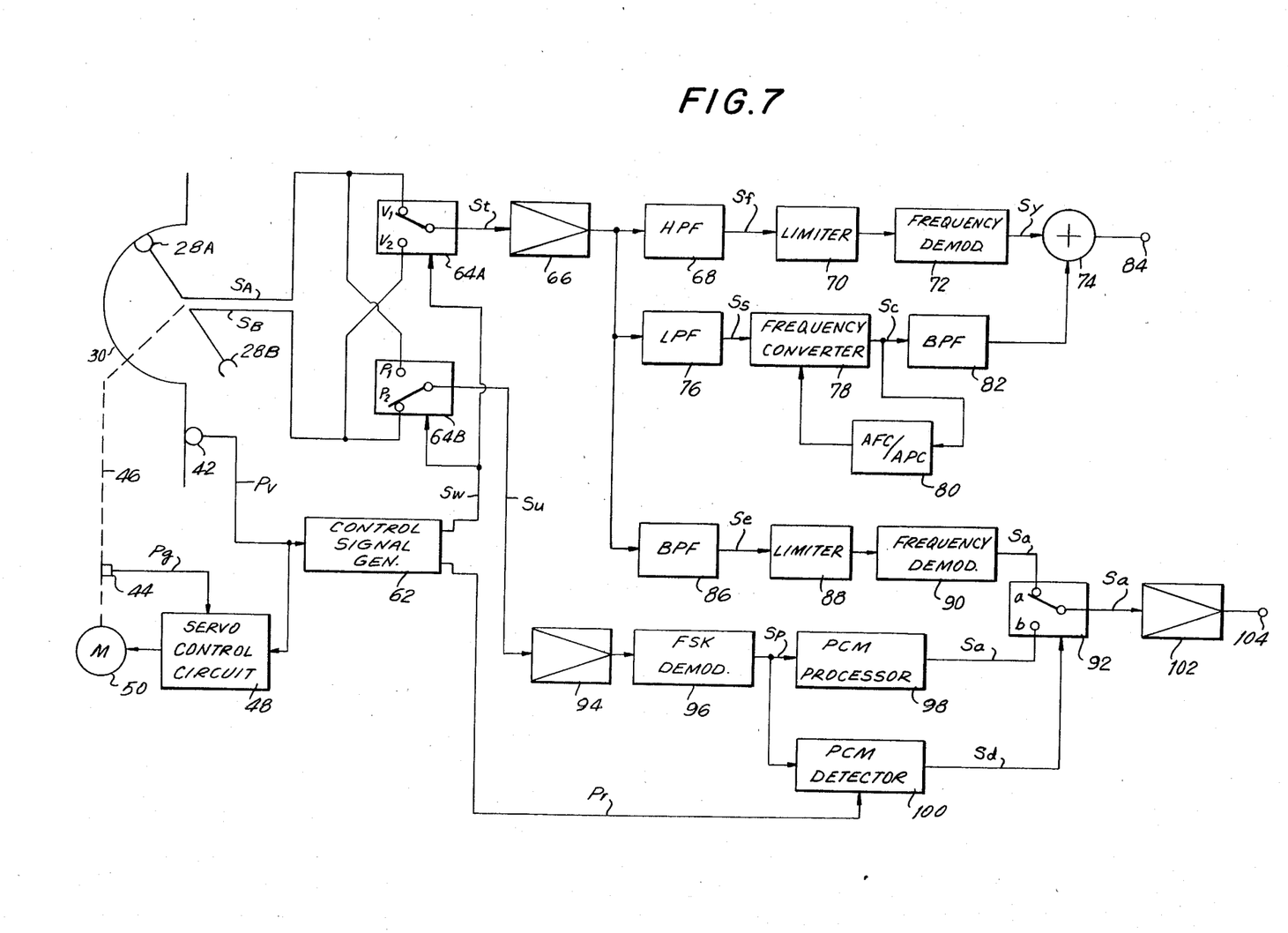
FIG. 7 is a block diagram of a reproducing section of a helical scan video tape recorder according to one embodiment of the present invention.

Referring now to FIG. 7, a reproducing section of a helical scan video tape recorder according to one embodiment of the present invention will now be described, in which elements corresponding to those previously described in regard to the VTRs of FIGS. 1 and 2 are identified by the same reference numerals and a detailed description thereof will be omitted herein for the sake of brevity. As shown therein, during the reproduction operation, magnetic head 42 reproduces the control pulse signal from servo control track 30G, which is synchronized with the vertical synchronizing signal $P_v$, and supplies the control pulse signal to servo control circuit 48. In the same manner as previously described in regard to the recording section of FIG. 1, servo control circuit 48, in response to the control pulse signal and pulses $P_g$ generated by pulse generator 44 controls motor 50 to accurately maintain the correct rotary speed and phase relation for magnetic heads 28A and 28B. The control pulse signal from magnetic head 42 is also supplied to a control signal generating circuit 62 which generates switch control signal $S_w$ and supplies the same to change-over switch circuits 64A and 64B. More particularly, rotary magnetic head 28A is coupled to input contacts $V_1$ and $P_1$ of change-over switch circuits 64A and 64B, respectively, while rotary magnetic head 28B is connected to input contacts $V_2$ and $P_2$ of switch circuits 64A and 64B, respectively. As shown by the timing charts of FIGS. 3D and 3F, when switch control signal $S_w$ is at a high or logic "1" level, output signal $S_A$ from magnetic head 28A is supplied through input contact $V_1$ of switch circuit 64A to the output thereof, while output signal $S_B$ from magnetic head 28B is supplied through input contact $P_2$ of switch circuit 64B to the output thereof. In like manner, when switch control signal $S_w$ is at a low or logic "0" level, output signal $S_A$ from magnetic head 28A is supplied through input contact $P_1$ of switch circuit 64B to the output thereof, while output signal $S_B$ from magnetic head 28B is supplied through input contact $V_2$ of switch circuit 64A to the output thereof. It is to be appreciated that switch control signal $S_w$ changes between a high or logic "1" level and a low or logic "0" level after each field interval of the video signal, that is, in synchronism with the vertical synchronizing signal $P_v$.

As a result of the aforementioned operation, the combined television signal $S_t$ recorded in the main section of each track corresponding to the last 180° rotation of each head with respect to the tracks is supplied from switch circuit 64A as a continuous signal, as shown in FIG. 3B, to a reproducing amplifier 66. Combined television signal $S_t$ from reproducing amplifier 66 is supplied to a high pass filter (HPF) 68 which separates the frequency-modulated luminance signal $S_f$ therefrom. A limiter circuit 70 limits the level of the frequency-modulated luminance signal $S_f$ from HPF 68 and a frequency demodulation circuit 72 demodulates the output signal from limiter circuit 70 to produce the original luminance component $S_y$, as shown in FIG. 3A, which is supplied to one input of an adder 74. Combined television signal $S_t$ is also supplied to a low pass filter (LPF) 76 which separates the frequency-converted chrominance signal $S_s$ therefrom. A frequency converter 78 frequency re-converts the frequency-converted chrominance signal $S_s$ to its original frequency band and thereby produces the original chrominance component $S_c$. An automatic frequency control (AFC) and automatic phase control (APC) circuit may also be provided as a feedback circuit for frequency converter 78 to control the frequency and phase of the chrominance component $S_c$. The chrominance component $S_c$ from frequency converter 78 is supplied through a band pass filter (BPF) 82 or comb filter to another input of adder 74 where it is added to the luminance component $S_y$ to produce the original color video signal at an output terminal 84.

Combined television signal $S_t$ is also supplied through a band pass filter (BPF) 86 which separates the frequency-modulated audio signal $S_e$ therefrom. A limiter circuit 88 followed by a frequency demodulation circuit 90 frequency demodulates audio signal $S_e$ to produce the original analog audio signal $S_a$, which is supplied to a first input contact a of a switch circuit 92.

The signal, which may or may not contain the PCM audio signal $S_u$, reproduced during the overscan section of each track is supplied from switch circuit 64B to a reproducing amplifier 94. The output signal from reproducing amplifier 94 is supplied to an FSK demodulation circuit 96 which is complementary to FSK modulation circuit 54 of FIG. 2 and which produces the compressed PCM audio signal $S_p$. A PCM processing circuit 98 processes the compressed PCM audio signal $S_p$ from FSK demodulation circuit 96 in a complementary manner to the characteristic imparted by PCM processing circuit 52 in the recording section of FIG. 2, to thereby produce the original analog audio signal $S_a$ at the output thereof. In particular, PCM processing circuit 98 expands the time base of the compressed PCM audio signal $S_p$ supplied thereto. PCM processing circuit 98 also includes a PCM decoding circuit which provides a characteristic complementary to the PCM encoding circuit of PCM processing circuit 52 and a digital-to-analog (D/A) converting circuit which returns the digitized audio signal to analog form to thereby produce the analog audio signal $S_a$ at an output thereof. In addition, PCM processing circuit 98 includes an error correcting decoder which decodes the PCM audio signal in accordance with the error correcting codes added by the PCM encoding circuit of PCM processing circuit 52. The analog audio signal $S_a$ from PCM processing circuit 98 is supplied to a second input contact b of switch circuit 92.

Figure 3H:
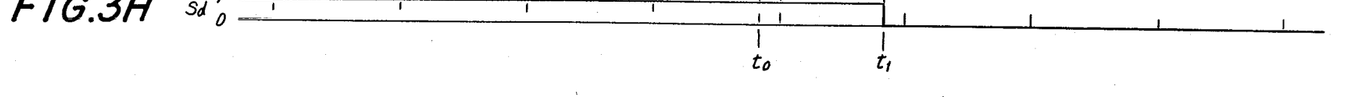

Switch circuit 92 has a movable arm which is controlled to connect either contact a or contact b to the output thereof in response to a PCM detection signal $S_d$, shown in FIG. 3H. More particularly, when a PCM audio signal $S_u$ is recorded in the overscan section of each track, PCM detection signal is at a high or logic "1" level and is at a low of logic "0" level when no PCM audio signal $S_u$ has been recorded. Accordingly, when PCM detection signal $S_d$ is at a high or logic "1" level, switch circuit 92 supplies the analog audio signal $S_a$ reproduced from the PCM audio signal $S_u$ through contact b and a reproducing amplifier 102 to an audio signal output terminal 104. On the other hand, when it is detected that no PCM audio signal $S_u$ has been recorded, PCM detection signal $S_d$ is at low or logic "0" level so that switch circuit 92 supplies the analog audio signal $S_a$ reproduced from the frequency-modulated audio signal $S_e$ through contact a and reproducing amplifier 102 to audio signal output terminal 104.

As shown in FIG. 7, control signal generating circuit 62 also produces a gate signal $P_r$ (FIG. 6G) which is delayed by slightly less than one field interval from each vertical synchronizing signal $P_v$ to coincide with the reproduction of the run-in signal RI during the first 5° rotation of the magnetic heads with respect to the record tracks. Gate signal $P_r$ is supplied to one input of a PCM detecting circuit 100 and the signal reproduced during the first 35° rotation of the magnetic heads with respect to the record tracks is supplied from switch circuit 64B to another input of PCM detecting circuit 100. More particularly, the output from FSK demodulation circuit 96 is supplied to PCM detecting circuit 100. It is to be appreciated that, if a PCM audio signal $S_u$ is reproduced from the record tracks, a run-in signal RI and the compressed PCM audio $S_p$ from FSK demodulation circuit 96 are supplied to PCM detecting circuit 100. In such case, since the duration of each pulse of gate signal $P_r$ coincides with the occurrence of the run-in signal RI, PCM detecting circuit 100 detects the occurrence of the run-in signal RI. If a run-in signal RI is detected, PCM detecting circuit 100 supplies PCM detection signal $S_d$ at a high or logic "1" level to switch circuit 92, as shown in FIG. 3H, for example, at time $t_0$, so that switch circuit 92 supplies the analog audio signal $S_a$ reproduced from PCM audio signal $S_u$ through contact b to audio signal output terminal 104. On the other hand, if no PCM audio signal $S_u$ has been recorded, that is, recording was performed by a Type I VTR, no run-in signal RI is present so that PCM detecting circuit 100 supplies PCM detection signal $S_d$ at a low or logic "0" level to switch circuit 92. In response thereto, switch circuit 92 supplies the analog audio signal $S_a$ reproduced from the frequency-modulated audio signal $S_e$, through contact a thereof to audio signal output terminal 104, as shown in FIG. 3H at time $t_1$. Accordingly, it is to be appreciated that, regardless of the type of VTR used for recording either the frequency-modulated audio signal or the PCM audio signal, the reproducing circuit of FIG. 7 according to the present invention always reproduces the correct audio signal $S_a$.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for reproducing an information signal recorded in a plurality of successive parallel tracks on a record medium and comprised of a video signal and at least one of a frequency-modulated audio signal and a digitized audio signal, with the video signal and frequency-modulated audio signal being recorded only in a main section of each track and the digitized audio signal being recorded only in an overscan section of each track, said apparatus comprising:
   transducer means for scanning said tracks to reproduce said information signal recorded in said plurality of successive parallel tracks;
   separation means for separating said information signal reproduced during scanning of the main section of each track by said transducer means and a signal reproduced during scanning of the overscan section of each track by said transducer means;
   detecting means for detecting whether said separated signal reproduced during scanning of said overscan section of each track includes a digitized audio signal and producing a detection signal in response thereto;
   output means; and switch means for switching an audio signal corresponding to one of the digitized audio signal and frequency-modulated audio signal to the output means in response to the detection signal.

2. Apparatus according to claim 1; in which said video signal includes a vertical synchronizing signal; and said detecting means includes control signal generating means for producing a gate signal in synchronism with said vertical synchronizing signal, and digital detector means for detecting whether said separated signal reproduced during scanning of said overscan section of each track includes a digitized audio signal, in response to said gate signal and said separated signal reproduced during scanning of said overscan section of each track, and producing said detection signal in response thereto.

3. Apparatus according to claim 2; in which said separated signal reproduced during scanning of the overscan section of each track includes a run-in signal when said separated signal includes said digitized audio signal, and said digital detector means produces said detection signal in response to said gate signal and said run-in signal.

4. Apparatus according to claim 3; further including frequency-demodulation means for frequency-demodulating a frequency-modulated audio signal reproduced during scanning of the main section of each track to produce a first analog audio signal, and digital processing means for processing a digitized audio signal reproduced during scanning of the overscan section of each track to produce a second analog audio signal; and in which said switch means switches one of the first analog audio signal and the second analog audio signal to the output means in response to said detection signal.

5. Apparatus according to claim 4; in which said digital processing means includes time base expansion means for expanding the time base of said digitized audio signal, decoding means for decoding said digitized audio signal and digital-to-analog converting means for converting said digitized audio signal to said second analog audio signal.

6. Apparatus according to claim 2; in which said control signal generating means produces a switch control signal for controlling said separation means to separate said information signal reproduced during scanning of the main section of each track by said transducer means and the signal reproduced during scanning of the overscan section of each track by said transducer means.

7. Apparatus according to claim 6; in which said transducer means includes first and second head means for scanning said tracks to reproduce said information signal recorded in said plurality of successive parallel tracks; and said separation means includes a first switch connected to said first and second head means and controlled by said switch control signal to separate said information signal reproduced during scanning of the main section of each track by said first and second head means, and a second switch connected to said first and second head means and controlled by said switch control signal to separate said signal reproduced during scanning of the overscan section of each track by said first and second head means.

8. Apparatus according to claim 7; further including filter means for further separating said information signal reproduced during scanning of the main section of each track into said video signal and said frequency-modulated audio signal.

9. Apparatus according to claim 6; in which one field interval of said video signal is recorded in each track, and said switch control signal alternates between two different states for successive field intervals.

10. A method of reproducing an information signal recorded in a plurality of successive parallel tracks on a record medium and comprised of a video signal and at least one of a frequency-modulated audio signal and a digitized audio signal, with the video signal and frequency-modulated audio signal being recorded only in a main section of each track and the digitized audio signal being recorded only in an overscan section of each track, said method comprising the steps of:

scanning said tracks to reproduce said information signal recorded in said plurality of successive parallel tracks;

separating said information signal reproduced during scanning of the main section of each track and a signal reproduced during scanning of the overscan section of each track;

detecting whether said separated signal reproduced during scanning of said overscan section of each track includes a digitized audio signal;

producing a detection signal in response to said step of detecting; and switching an audio signal corresponding to one of said digitized audio signal and said frequency-modulated audio signal to output means in response to said detection signal.

11. A method according to claim 10; in which said video signal includes a vertical synchronizing signal, and said step of detecting includes the steps of producing a gate signal in synchronism with said vertical synchronizing signal, detecting whether said separated signal reproduced during scanning of the overscan section of each track includes a digitized audio signal, in response to said gate signal and said separated signal reproduced during scanning of the overscan section of each track, and producing said detection signal in response to said latter step of detecting.

12. A method according to claim 11; in which said separated signal reproduced during scanning of the overscan section of each track includes a run-in signal when said separated signal includes said digitized audio signal, and said step of producing includes the step of producing said detection signal in response to said gate signal and said run-in signal.

13. A method according to claim 12; further including the steps of producing a first analog audio signal by frequency-demodulating a frequency-modulated audio signal reproducing during scanning of the main section of each track and producing a second analog audio signal by processing a digitized audio signal reproduced during scanning of the overscan section of each track; and in which said step of switching includes the step of switching one of the first analog audio signal and the second analog audio signal to the output means in response to said detection signal.

14. A method according to claim 13; in which said step of producing said second analog audio signal includes the steps of expanding the time base of said digitized audio signal, decoding said digitized audio signal and converting said digitized audio signal to said second analog audio signal.

15. A method according to claim 10; further including the step of producing a switch control signal, and in which said step of separating includes the step of separating said information signal reproduced during scanning of the main section of each track by said transducer means and the signal reproduced during scanning of the overscan section of each track by said transducer means, in response to said switch control signal.

* * * * *